(12) United States Patent
Barber et al.

(10) Patent No.: US 9,385,889 B2
(45) Date of Patent: Jul. 5, 2016

(54) UNIVERSAL DELIVERY NOTIFICATION FOR DIGITAL MESSAGES

(75) Inventors: Timothy P. Barber, Boise, ID (US); Rich L. Stuppy, Meridian, ID (US)

(73) Assignee: Keynetics Inc., Boise, ID (US)

( * ) Notice: Subject to any disclaimer, the term of this patent is extended or adjusted under 35 U.S.C. 154(b) by 436 days.

(21) Appl. No.: 13/211,267

(22) Filed: Aug. 16, 2011

(65) Prior Publication Data

US 2013/0046834 A1 Feb. 21, 2013

(51) Int. Cl.
| | |
|---|---|
| *G06F 15/16* | (2006.01) |
| *H04L 12/64* | (2006.01) |
| *H04L 12/58* | (2006.01) |
| *H04L 12/24* | (2006.01) |
| *G06Q 10/10* | (2012.01) |

(52) U.S. Cl.
CPC ............ *H04L 12/6418* (2013.01); *H04L 51/18* (2013.01); *H04L 51/24* (2013.01); *H04L 51/34* (2013.01); *G06Q 10/107* (2013.01); *H04L 41/026* (2013.01); *H04L 41/509* (2013.01)

(58) Field of Classification Search
CPC ..... H04L 41/509; H04L 41/026; H04L 51/18; H04L 51/24; H04L 51/34; G06Q 10/107
See application file for complete search history.

(56) References Cited

U.S. PATENT DOCUMENTS

| | | | |
|---|---|---|---|
| 7,221,949 B2 * | 5/2007 | Clough ...................... | 455/456.3 |
| 7,792,142 B2 | 9/2010 | Taniguchi et al. | |
| 7,917,961 B2 | 3/2011 | McIsaac et al. | |
| 8,121,919 B2 | 2/2012 | Lapstun et al. | |
| 8,374,590 B1 * | 2/2013 | Mikan et al. ................ | 455/414.3 |
| 2002/0104026 A1 * | 8/2002 | Barra et al. .................... | 713/202 |
| 2003/0187939 A1 | 10/2003 | O'Brien | |
| 2004/0203948 A1 | 10/2004 | Provost et al. | |
| 2005/0251861 A1 | 11/2005 | Cunningham et al. | |
| 2007/0136430 A1 | 6/2007 | Qureshi et al. | |
| 2007/0220144 A1 * | 9/2007 | Lovell .......................... | 709/224 |
| 2010/0003969 A1 * | 1/2010 | Isobe et al. ................. | 455/412.1 |
| 2010/0304766 A1 | 12/2010 | Goyal | |
| 2011/0081888 A1 | 4/2011 | Waniss | |
| 2011/0276638 A1 * | 11/2011 | Errico et al. ................. | 709/206 |

OTHER PUBLICATIONS

Patent Cooperation Treaty, International Search Report and Written Opinion, International Patent Application No. PCT/US2012/048537, Sep. 28, 2012, 14 pages.

* cited by examiner

*Primary Examiner* — Patrice Winder
*Assistant Examiner* — Nam Tran
(74) *Attorney, Agent, or Firm* — Fenwick & West LLP

(57) ABSTRACT

A sending device transmits a message to a receiving device. After receiving the message, the receiving device transmits a delivery confirmation to a third party notification service. The delivery confirmation includes an ID corresponding to the receiving device, an ID corresponding to the sending device, the time of transmission, the time of reception, the format of the message and/or a message ID. This delivery confirmation is subsequently stored by the notification service. The sending device then sends a delivery inquiry to the notification service. The delivery inquiry includes information that allows the notification service to identify a stored delivery confirmation. If a message corresponding to the delivery inquiry is identified, the notification service responds to the sending device affirming that the message was successfully delivered. The notification service may also respond with multiple delivery confirmations that meet the criteria of the delivery inquiry.

22 Claims, 5 Drawing Sheets

UNIVERSAL DELIVERY NOTIFICATION FOR DIGITAL MESSAGES

BACKGROUND

This invention relates generally to digital messaging, and more particularly to receiving and providing confirmation that a message has been delivered. Additionally, once a message has been delivered, information related to the state of the recipient may also be conveyed.

Messages that are sent to devices, such as mobile phones, are often time sensitive. Verifying that a message has been received, and when it was received, can be crucial to operating a business or arranging social gatherings in everyday life. Additionally, employers can utilize delivery confirmation to ensure that a message has been received by on call personnel, limiting situations in which the employers lack proper staffing. However, without explicit acknowledgment from a recipient of a message, a sender can only hope that the message was delivered as intended.

Messages are often sent with a desired outcome in mind. This desired outcome can be related to a personal, business or systemic situation in which a sender of a message wants to induce a desired outcome. Currently there is no method to confirm delivery and sample the state of the receiver upon delivery. Disclosed is a system that confirms delivery of messages, provides feedback to the sender on the current and subsequent state of the receiver, and maintains privacy by not revealing the contents of the message.

Once a message has been received, it is valuable to the sending device to understand various aspects of the state of the receiving device, and or subsequent states of the user of the receiving device. This information is useful in making communication more effective and to understand if a message, once received, has lead to the desired outcome. Presently, there is no effective method for obtaining feedback related to the effect a message has on a user who receives a message.

Providing delivery notifications is further complicated by multiple operating systems being used by several network providers to deliver messages in various formats. Existing methods for providing message delivery confirmation may necessitate that communicating devices run the same operating system, e.g., BlackBerry OS, or require interaction from a user to confirm receipt of a message.

SUMMARY

Embodiments of the invention provide a method and system for delivery notification for digital messages. Delivery notification is provided regardless of the operating system used on sending and receiving devices, the network provider used to transmit a message and the format of the message. A sending device transmits a message to a receiving device. After receiving the message, the receiving device transmits a delivery confirmation to a third party notification service. The delivery confirmation can include an ID corresponding to the receiving device, an ID corresponding to the sending device, the time of transmission, the time of reception, the format of the message and/or a message ID. This delivery confirmation is subsequently stored by the notification service.

Simultaneous to or subsequent to generating and sending the confirmation to the third party notification service, the receiving device sends information about the state of the receiving device to the reporting service. The sending device may also send information about the changes in their state, or the sending device's user's state, following the receipt of the message. In one embodiment, the state of the receiving device includes a biological description of the user of the receiving device. The biological description may include heart rate, emotional state and blood pressure. This information is valuable to the original sender as it can provide an indication of whether the message has had its desired effect.

The sending device then sends a delivery inquiry to the notification service. The delivery includes information that allows the notification service to uniquely identify a stored delivery confirmation. For example, the delivery inquiry may include an ID corresponding to the receiving device, an ID corresponding to the sending device, the time of transmission, the time of reception, the format of the message and/or a message ID. If a message corresponding to the delivery inquiry is identified, the notification service responds to the sending device affirming that the message was successfully delivered and any state information transmitted by the receiving device. In one embodiment, the notification service transmits the stored delivery confirmation to the sending device. The notification service may also respond with multiple delivery confirmations that meet the criteria of the delivery inquiry. The notification service is able to receive and provide delivery notifications without having access to the contents of the message itself This allows the sender and receiver to maintain security and privacy.

If no matching delivery confirmation is stored in the notification service, the notification service may periodically check whether the delivery confirmation has been received. If the delivery confirmation is later received, the notification service can send the delivery confirmation to the sending device without receiving an additional inquiry. In addition, the sending device may repeatedly send inquiries for a delivery confirmation of the message. In another embodiment, the sending device is identified in the delivery confirmation and the notification service may send the delivery confirmation to the sending device without first receiving an inquiry.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
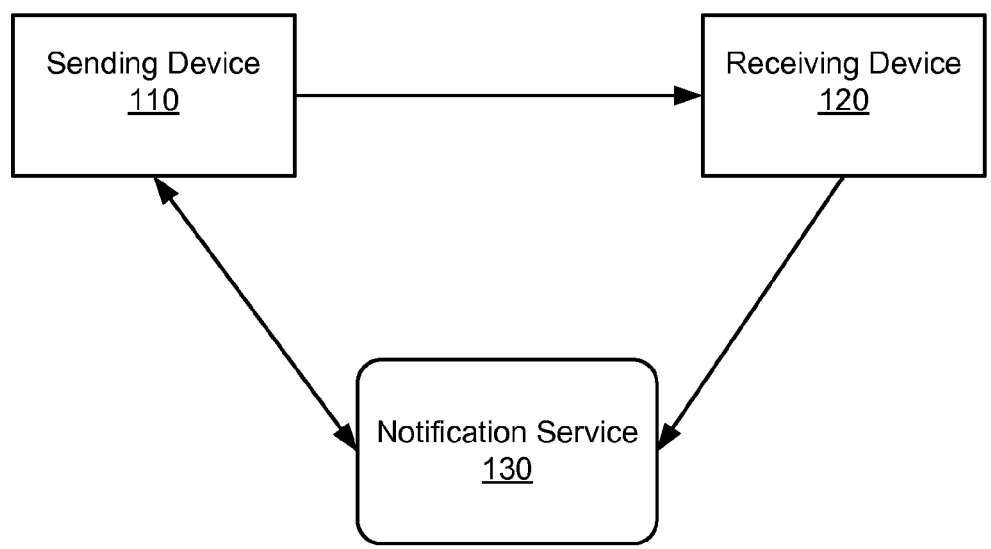
FIG. 1 is a diagram illustrating a sending device, receiving device and notification service in accordance with an embodiment of the invention.

FIG. 1 is a diagram illustrating a sending device 110, a receiving device 120 and a notification service 130 in accordance with an embodiment of the invention. The sending device 110 transmits a digital message to the receiving device 120. The sending device 110 and the receiving device 120 can be any devices capable of sending or receiving a digital message. For example, sending device 110 and receiving device 120 can be desktop PCs, laptop PCs, tablet PCs, mobile phones or smart phones. The message may be in a variety of formats including SMS, PIN, email, chat session, textual post, status update, form entry and voicemail. A status update includes posts made on social networking websites. The message may also include identifying information such as the identity of the sending device 110, the identity of the receiving device 120, the time the message was sent and a message ID. The identifying information can later be used to differentiate the message from a plurality of other messages.

After receiving the message, the receiving device 120 generates a delivery confirmation and transmits the delivery confirmation to the notification service 130. In one embodiment, the delivery confirmation can include an ID corresponding to the receiving device, an ID corresponding to the sending device, the time of transmission, the time of reception, the format of the message and/or a message ID. In one embodiment, information included in the delivery confirmation can uniquely identify the message. The notification service 130 receives the delivery confirmation and stores it.

In another embodiment, after receiving the message, the receiving device 120 generates a delivery confirmation and transmits the delivery confirmation to the notification service 130. The delivery confirmation can include information that describes characteristics about the state of the receiving device. For example it could include information that uniquely identifies the device on which the message was received. The delivery confirmation may provide additional details such as the location of the receiver or receiving device when the message was received. It could also contain information about the network over which the message was transmitted. This information could include the cell phone tower, IP route, DNS servers employed, hops in the route taken by the message or the wireless access point through which the connection to the device was made and the message was delivered. This information may be useful for determining whether the message was received by the appropriate party and if the appropriate actions were taken based on the contents of the message. If a message is intended for a specific, receiving device, user, or biological entity, this information would be useful in understanding if the message was received by the wrong party. For example, by fraudulently representing the proper receiver. In this manner the system can be used for detecting the fraud and fraudulent access of accounts and messages.

The transmission containing state information can occur subsequent to the transmission of the delivery confirmation.

In another embodiment after receiving the message, the receiving device 120 generates a delivery confirmation and transmits the delivery confirmation to the notification service 130. The delivery confirmation can include information that describes characteristics about the state of the person, biological entity or user receiving the message. A biological entity is defined as a living thing. For example it could include information that uniquely identifies the biological entity which received the message through methods including fingerprint and DNA sampling. The delivery confirmation may provide additional details such as the location of the biological entity. It could also contain information about the biological, physical or emotional characteristics of the person or biological entity receiving the message. The disclosed system and method apply the type of information that one collects via sensors resident or attached to or associated with the receiving device. These include but are not limited to heart rate, blood pressure, relative emotional state (happy, sad, angry etc), level of intoxication, level of sobriety, height, weight and other characteristics that can be collected via a sensor or input by a person or biological entity. The state information may also indicate a change in biological, physical, or emotional characteristics after receiving the message. This information could be useful for inferring if the message was received by the appropriate party and if the appropriate actions were taken based on the contents of the message. This information would be useful in understanding if the message was received by the wrong party through fraudulent representation or otherwise. In this manner the system can be used for detecting the fraud and fraudulent access of accounts and messages. This may also be used to understand if the message had the desired effect on the user of the receiving device 120. In one embodiment, the feedback is then be used by the sender to modify the content and tone of future messages to achieve the desired result. This could also be used for a variety of analytical purposes. The notification service 130 does not have access to the content of messages and the privacy of the content of messages is maintained.

In another embodiment, after receiving the message, the receiving device 120 generates a delivery confirmation and transmits the delivery confirmation to the notification service 130. The delivery confirmation can include information that describes characteristics about the state of a machine, computer, mechanical device or other non-living entity which has received the message. This information includes typical information that one collects via sensors resident, attached to or associated with the receiving device. These include but are not limited to characteristics that can be collected via a sensor or input via a machine to machine interface including speed, location, temperature, proximity to objects such as people, machines, devices and buildings, states of one or more subsystems, and values contained in data storage entities. The data storage entities may include accounts, register and memory. This information may be useful for inferring if the message was received by the appropriate party and if the appropriate actions were taken based on the contents of the message. This information would be useful in understanding if the message was received by the wrong party. For example by fraudulently representing the proper receiving device. In this manner the system can be used for detecting the fraud and fraudulent access of accounts and messages. In one embodiment, this is used to understand if the message had the desired effect on the receiving device. The feedback is passed to the sending device, allowing the sender to modify the content and/or tone of future messages to achieve the desired result. This could also be used for a variety of analytical purposes. Again, the notification service 130 does not view the content of the message and the privacy of the content is preserved.

In a situation where multiple messages are transmitted the receiving device can provide multiple samples of the state of the receiving device to the notification service. The notification can perform comparisons of the states related to multiple messages and determine the change is state of the receiver. This change in state is be relayed to the sender. The sender can then understand if the sent messages are creating the desired outcome.

At some point after sending the message, the sending device 110 sends a delivery inquiry to the notification service 130. In one embodiment, the notification service 130 is a server capable of receiving delivery confirmations and delivery inquiries from a plurality of sending and receiving devices. Use of a server between sending device 110 and receiving device 120 allows delivery notifications to occur without any limitations due to incompatibilities between the sending device 110 and receiving device 120. The notification service 130 may also be comprised of a plurality of servers, each server able to properly handle delivery confirmations and delivery inquiries from a plurality of sending devices and receiving devices. The delivery inquiry includes inquiry information that allows the notification service 130 to identify one or more delivery confirmations stored by the notification service. In some cases, the inquiry information may uniquely identify a stored delivery confirmation. If one or more matching delivery confirmations are found, the notification service 130 transmits the delivery confirmations to the sending device 110.

Hence, the sending device 110 can verify that the receiving device 120 actually received the message. It should be noted that the notification service 130 does not see the contents of the message. This allows the notification service 130 to operate without compromising the security of the sending device 110 or the receiving device 120. In addition, sending device 110 does not need to be limited to the role of sending messages. It is limited merely for clarity. In practice, both the sending device 110 and the receiving device 120 may send and receive messages between one another while fully functioning with the notification service 130.

Figure 2:
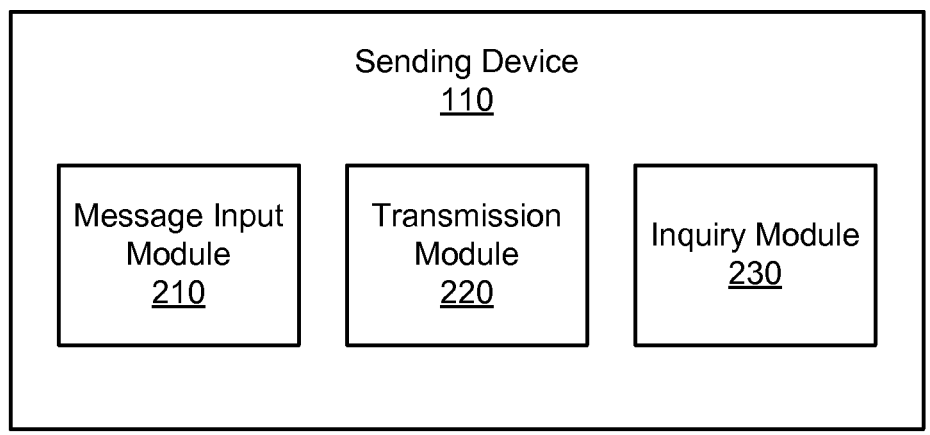
FIG. 2 is a high level block diagram of the sending device in accordance with an embodiment of the invention.

FIG. 2 is a high level block diagram of the sending device 110 in accordance with an embodiment of the invention. In one embodiment, sending device 110 is a mobile device running an operating system, e.g., ANDROID, IOS, and BLACKBERRY OS. Sending device 110 includes a message input module 210, a transmission module 220 and an inquiry module 230. These and other modules may be implemented as part of the operating system running on the sending device 110. In addition, the modules may, in whole or in part, be executed as an application in the operating system running on the sending device 110. Message input module 210 receives input from a user, the input including a message that is to be transmitted and a destination end point, or receiver, that the message will be transmitted to. In one embodiment, after receiving message input, the transmission module 220 adds metadata to the message. The metadata contains identifying information. For example, the metadata can include an ID corresponding to the receiver, an ID corresponding to the sending device, the time of transmission, the format of the message and/or a message ID. In one embodiment, transmission module 220 contacts the notification server 130 to obtain a unique message ID. The message is then sent to the receiver by transmission module 220.

Subsequently, inquiry module 230 sends a delivery inquiry to the notification server 130. The delivery inquiry includes identifying information that may include a portion of the metadata that was sent as part of the message. This identifying information allows the notification server 130 to identify one or more messages that are associated with the identifying information included in the delivery inquiry. In one embodiment, inquiry module 230 sends delivery inquiries automatically after a message has been sent. The inquiries may be resent for a certain length of time if a delivery confirmation associated with a certain message has not been received. In one embodiment, if a delivery confirmation is not returned by the notification server 130, the sending device 110 resends the message to the receiving device 120.

Figure 3:
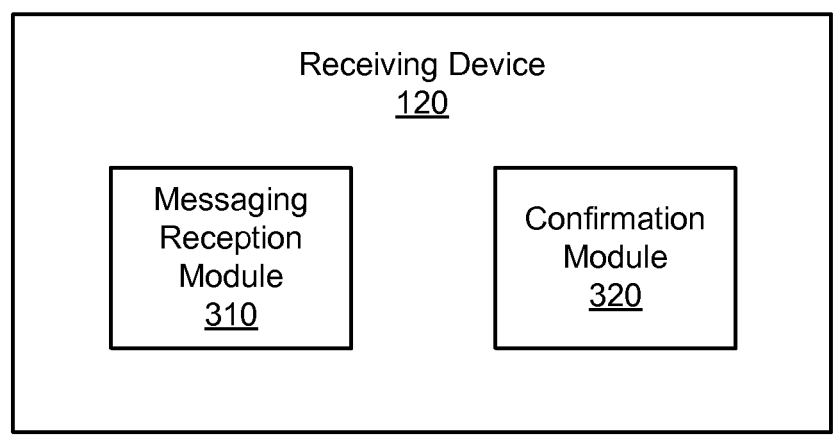
FIG. 3 is a high level block diagram of the receiving device in accordance with an embodiment of the invention.

FIG. 3 is a high level block diagram of the receiving device 120 in accordance with an embodiment of the invention. In one embodiment, receiving device 120 is a mobile device running an operating system, e.g., ANDROID, IOS, and BLACKBERRY OS. The receiving device 120 can be a different type of device and running a different operating system from those of the sending device 110. The only compatibility consideration is that the sending device 110 is able to send a message to the receiving device 120. Receiving device 120 includes a messaging reception module 310 and a confirmation module 320. These and other modules may be implemented as part of the operating system running on the receiving device 120. In addition, the modules may, in whole or in part, be executed as an application in the operating system running on the receiving device 120. Messaging reception module 310 receives a message transmitted by the sending device 110. The message may include metadata as described above including the identity of the sender, the time of transmission and/or a message ID. Using this metadata and any other information available to the receiving device 120, a confirmation module 320 generates a delivery confirmation. The delivery confirmation may include identifying information such as an ID corresponding to the receiving device, an ID corresponding to the sending device, the time of transmission, the time of reception, the format of the message, the message type and/or a message ID. Subsequently, the confirmation module 320 transmits the delivery confirmation module to the notification service 130. The receiving device 120 does not include the full message in the delivery confirmation and does not otherwise allow the notification server 130 to view the contents of the message.

Figure 4:
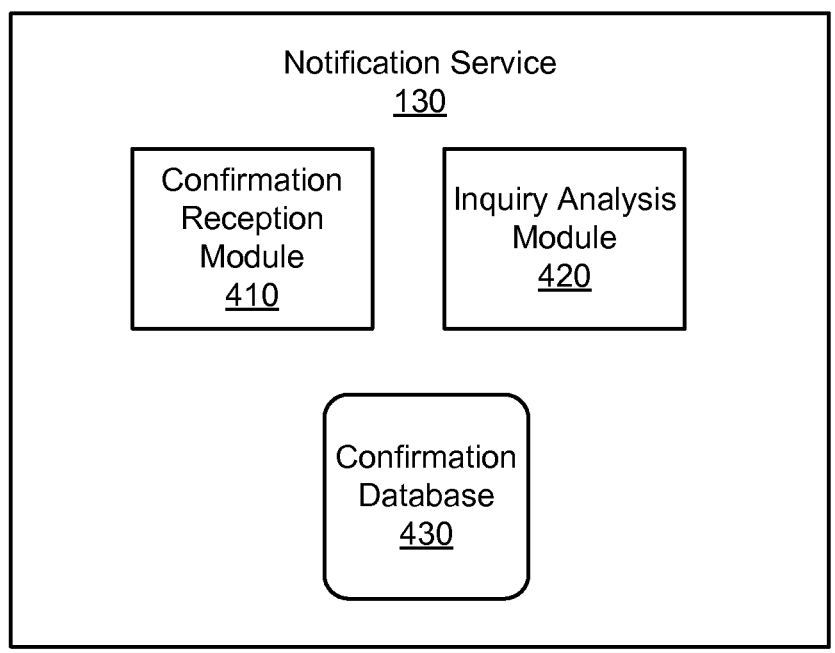
FIG. 4 is a high level block diagram of the notification service in accordance with an embodiment of the invention.

FIG. 4 is a high level block diagram of the notification service 130 in accordance with an embodiment of the invention. Confirmation reception module 410 is operable to receive delivery confirmations from the receiving device 120. Upon receiving a delivery confirmation, the delivery confirmation is stored in a confirmation database 430.

Inquiry analysis module 420 receives inquiries from the sending device 110. Inquiries typically may contain message identifying information including an ID corresponding to the receiver, an ID corresponding to the sending device, the time of transmission, the time of reception, the format of the message and/or a message ID. Upon receiving an inquiry, inquiry analysis module 420 analyzes the delivery confirmations stored in the confirmation database 430 to determine whether any stored delivery confirmations match the criteria contained in an inquiry.

The delivery confirmations that match the criteria contained in the inquiry are returned to the sending device 110 as verification that the messages associated with the delivery confirmations have been successfully delivered. If no stored delivery confirmations match the criteria contained in the inquiry, the sending device 110 is notified of this outcome as well. In one embodiment, a delivery confirmation is removed from the confirmation database 430 after an inquiry has been replied to containing the delivery confirmation or a certain amount of time has passed. In one embodiment, after receiving an inquiry and finding no matching delivery confirmation, the inquiry is stored in the confirmation database 430 and tagged as not yet fulfilled. The notification service 130 can then periodically check whether or not a matching delivery confirmation has been received. This would reduce the need for the sending device 110 to resend inquiries in situations where the receiving device is turned off and does not reply with a delivery confirmation soon after receiving the message.

Figure 5:
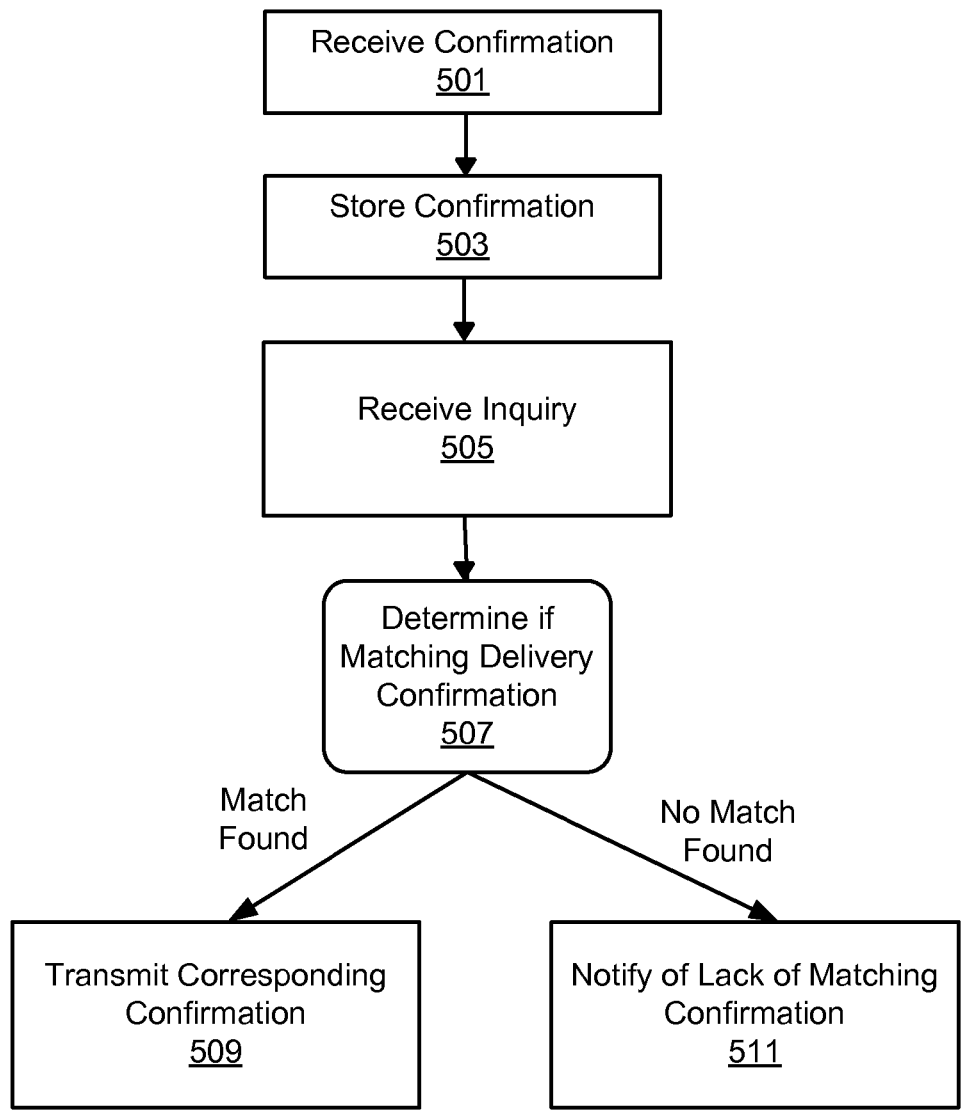
FIG. 5 is a diagram describing the steps performed by the notification service in accordance with an embodiment of the invention.

FIG. 5 is a diagram describing the steps performed by the notification service 130 in accordance with an embodiment of the invention. A delivery confirmation is received 501 from a receiving device. The delivery confirmation is stored 503 in the confirmation database 430. Subsequently, a delivery inquiry is received 505 from a sending device. The inquiry is analyzed and the notification service 130 determines 507 whether or not there are any delivery confirmations stored in the confirmation database 430 which match the message information specified by the delivery inquiry.

If one or more matching delivery confirmations are found, the matching delivery confirmations are transmitted 509 to the sending device to verify delivery. In one embodiment, an affirmative notification is transmitted to the sending device rather than the delivery confirmation itself If no matching delivery confirmations are found, the notification service 130 notifies 511 the sending device that no matching delivery confirmations have been found.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable storage medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method of providing delivery notification the method comprising:

receiving a delivery confirmation from a first device, the delivery confirmation including a first set of message identifying information associated with a message received by the first device and state information describing at least one of biological and emotional characteristics of a person receiving the message through the first device;

storing the delivery confirmation;

receiving an inquiry from a second device, the inquiry including a second set of message identifying information;

determining, without accessing content of the message received by the first device, whether the second set of message identifying information matches criteria contained in the first set of message identifying information; and transmitting a response to the second device, wherein the response includes feedback to modify content of a subsequent message sent from the second device to the first device.

2. The computer-implemented method of claim 1, wherein the response is the delivery confirmation including the first set of message identifying information, and the delivery confirmation further comprises state information describing characteristics about the state of the first device.

3. The computer-implemented method of claim 1, further comprising:

determining, based on the state information, whether the message was fraudulently received by the first device instead of an intended first device.

4. The computer-implemented method of claim 1, wherein the first set of message identifying information includes a unique message identification.

5. The computer-implemented method of claim 1, wherein the state information describing at least one of biological and emotional characteristics of a person receiving the message through the first device includes one or more of heart rate, blood pressure and emotional state of the person.

6. The computer-implemented method of claim 1, wherein the second set of message identifying information includes an identification associated with the first device, an identification associated with the second device, and a time associated with the message.

7. The computer-implemented method of claim 1, wherein the message is an email, an SMS message, a PIN message, a status update, a textual post, or a voicemail.

8. The method of claim 1, wherein the state information further comprises state information indicating a change in at least one of biological, physical or emotional characteristics of the person receiving the message.

9. The method of claim 1, further comprising determining whether the message has the desired effect on the person receiving the message based on the state information.

10. The method of claim 1, further comprising transmitting a response to the second device, the response including feedback to modify tone of a subsequent message sent from the second device to the first device.

11. The method of claim 1, further comprising maintaining privacy of the content of the message by blocking the access of the content of the message while analyzing the delivery confirmation from the first device and the inquiry from the second device.

12. A computer program product for providing delivery Notification, the computer program product comprising a non-transitory computer-readable storage medium containing executable computer program code for:
- receiving a delivery confirmation from a first device, the delivery confirmation including a first set of message identifying information associated with a message received by the first device and state information describing at least one of biological and emotional characteristics of a person receiving the message through;
- storing the delivery confirmation;
- receiving an inquiry from a second device, the inquiry including a second set of message identifying information;
- determining, without accessing content of the message received by the first device, whether the second set of message identifying information matches criteria contained in the first set of message identifying information; and
- transmitting a response to the second device, wherein the response includes feedback to modify content of a subsequent message sent from the second device to the first device.

13. The computer program product of claim 12, wherein the response is the delivery confirmation including the first set of message identifying information and the delivery confirmation further comprises state information describing characteristics about the state of the first device.

14. The computer program product of claim 12, further comprising:
- determining, based on the state information, whether the message was fraudulently received by the first device instead of an intended first device.

15. The computer program product of claim 12, wherein the first set of message identifying information includes a unique message identification.

16. The computer program product of claim 12, wherein the state information describing at least one of biological and emotional characteristics of a person receiving the message through of the first device includes one or more of heart rate, blood pressure and emotional state of the person.

17. The computer program product of claim 12, wherein the second set of message identifying information includes an identification associated with the first device, an identification associated with the second device, and a time associated with the message.

18. The computer program product of claim 12, wherein the message is an Email, an SMS message, a PIN message, a status update, a textual post, or a voicemail.

19. The computer program product of claim 12, wherein the state information further comprises state information indicating a change in at least one of biological, physical or emotional characteristics of the person receiving the message.

20. The computer program product of claim 12, further comprising computer program code for determining whether the message has the desired effect on the person receiving the message based on the state information.

21. The computer program product of claim 12, further comprising computer program code for transmitting a response to the second device, the response including feedback to modify tone of a subsequent message sent from the second device to the first device.

22. The computer program product of claim 12, further comprising computer program code for maintaining privacy of the content of the message by blocking the access of the content of the message while analyzing the delivery confirmation from the first device and the inquiry from the second device.

\* \* \* \* \*